United States Patent
Mauthner et al.

(10) Patent No.: US 8,034,321 B2
(45) Date of Patent: Oct. 11, 2011

(54) HYDROGEN PRODUCTION

(75) Inventors: Klaus Mauthner, Grafenstein (AT);
Ernst Hammel, Vienna (AT)

(73) Assignee: Electrovac AG, Klosterneuburg (AT)

( * ) Notice: Subject to any disclaimer, the term of this patent is extended or adjusted under 35 U.S.C. 154(b) by 390 days.

(21) Appl. No.: 11/795,635

(22) PCT Filed: Jan. 23, 2006

(86) PCT No.: PCT/AT2006/000032
§ 371 (c)(1),
(2), (4) Date: Jul. 19, 2007

(87) PCT Pub. No.: WO2006/084295
PCT Pub. Date: Aug. 17, 2006

(65) Prior Publication Data
US 2008/0159938 A1    Jul. 3, 2008

(30) Foreign Application Priority Data
Feb. 10, 2005  (EP) .................................. 05450026

(51) Int. Cl.
*C01B 3/26*    (2006.01)
*C01B 31/02*   (2006.01)
*B01J 19/00*   (2006.01)

(52) U.S. Cl. ........ 423/652; 422/171; 423/458; 423/653; 423/654

(58) Field of Classification Search .......... 423/650–654, 423/458; 422/171
See application file for complete search history.

(56) References Cited

U.S. PATENT DOCUMENTS

| | | | |
|---|---|---|---|
| 1,868,921 A | | 7/1932 | Schmidt et al. |
| 2,760,847 A | | 8/1956 | Oblad et al. |
| 3,284,161 A | | 11/1966 | Pohlnez et al. |
| 6,315,977 B1 * | | 11/2001 | Cantacuzene ................. 423/651 |
| 6,670,058 B2 * | | 12/2003 | Muradov ........................ 429/17 |
| 6,875,417 B1 * | | 4/2005 | Shah et al. .................... 423/650 |

(Continued)

FOREIGN PATENT DOCUMENTS

| | | |
|---|---|---|
| CN | 1388790 A | 1/2003 |
| CN | 1586718 A | 3/2005 |
| JP | 2003 146606 | 5/2003 |
| JP | 2004 74061 | 3/2004 |
| JP | 2004-236377 | 8/2004 |

OTHER PUBLICATIONS

Muradov, Nazim. *Hydrogen via methane decomposition: an application for decarbonization of fossil fuels*. International Journal of Hydrogen Energy, vol. 26 (2001) pp. 1165-1175.

(Continued)

*Primary Examiner* — Wayne Langel
(74) *Attorney, Agent, or Firm* — Merchant & Gould P.C.

(57) ABSTRACT

A method is described for producing a hydrogen-containing gas mixture from a suitable hydrocarbon-containing feed gas in a reformer, wherein at least part of the feed gas is diverted before it enters the reformer and is supplied to at least one secondary reformer, and wherein the feed gas is contacted with a nanostructured catalyst in the secondary reformer and the substantially CO and CO2 -free exhaust gases of the secondary reformer are either combined with the hydrogen-containing gas mixture which escapes the reformer or introduced into the reformer. Furthermore there is described the use of this method for producing high quality soots, nanoonions, nanohorns, nanofibers and/or nanotubes which adhere to the catalyst, and a device for producing a hydrogen-containing gas mixture from a suitable feed gas in a reformer which comprises a supply line with a super-heated-vapor line joining said supply line, and a discharge line.

32 Claims, 3 Drawing Sheets

U.S. PATENT DOCUMENTS

| | | | |
|---|---|---|---|
| 7,001,586 B2* | 2/2006 | Wang et al. | 423/650 |
| 7,468,097 B2* | 12/2008 | Henley et al. | 95/139 |
| 2002/0007594 A1 | 1/2002 | Muradov | |
| 2002/0155037 A1 | 10/2002 | Otsuka et al. | |
| 2004/0033193 A1* | 2/2004 | Chen | 423/658.2 |
| 2004/0253168 A1 | 12/2004 | Chu | |

OTHER PUBLICATIONS

Aiello, Rita, et al. *Hydrogen production via the direct cracking of methane over Ni/SiO2: catalyst deactivation and regeneration.* Applied Catalyst A: General 192 (2000) pp. 227-234.

Bacon, Roger. "Growth, Structure, and Properties of Graphite Whiskers." *Journal of Applied Physics*, vol. 31, No. 2, Feb. 1960, pp. 285-289.

Ermakova et al. "Ni/SiO2 and Fe/SiO2 catalysts for production of hydrpgen and filamentous carbon methane decomposition." *Catalysis Today*, vol. 77, 2002, pp. 225-235.

Lynum et al. "Kvierner Based Technologies for Environmentally Friendly Energy and Hydrogen Production." CB&H Prozess,. Proc,12$^{th}$ World Hydrogen Energy Conference, Buenos Aires, 1998, pp. 637-645.

Padro et al. "Survey of the Economics of Hydrogen Technologies." National Renewable Energy Laboratory, Sep. 1999 pp. 1-54.

* cited by examiner

HYDROGEN PRODUCTION

The present invention relates to a method for producing a hydrogen-containing gas mixture from a suitable hydrocarbon-containing feed gas in a reformer.

Method improvements are described for catalytic cleavage of hydrocarbons in hydrogen and solid carbon, with the keynote of minimizing and/or avoiding $CO_2$ emission to the environment. The invention further describes improvements as to economically conducting processes, and, moreover, the use of biomass and the material resulting therefrom are taken into account, said materials being regarded as potential source of raw materials for hydrocarbon. This is also a contribution to the economical, environmentally friendly use of hydrogen energy scenarios.

Hydrogen, a colorless and odorless gas, almost insoluble in water, was discovered by the English scientist Henry Cavendish in 1766. In the laboratory it is produced by electrolysis of water or by action of diluted acids on zinc or iron. It is industrially produced by two-step methods, wherein in the first step CO and $H_2$ is produced by combustion of hydrocarbon with steam, and in the second step CO is converted to $CO_2$ by the water-gas reaction ($CO+H_2O \rightarrow CO_2+H_2$). Carbon dioxide is then removed by washing.

Interest in hydrogen as energy source was growing in the early 70s, during the first oil crisis, as scientists constructed scenarios concerning the role of hydrogen. During the 80s great efforts were being made to develop new technologies regarding renewable energy sources and hydrogen, with the aim of reducing the dependence on fossil energy sources or even abandoning them (National Renewable Energy Laboratory, 1995).

With today's knowledge, hydrogen is considered to have the potential of being the future energy source which is largely independent of conventional resources. Key technologies therefor are hydrogen production, its storage, transport and conversion into energy.

According to estimates by the IEA, 95% of today's worldwide hydrogen production are of carbon-containing raw materials, mostly of fossil origin. In most of the conventional processes said carbon is converted into $CO_2$ which escapes into the atmosphere. Due to the knowledge that greenhouse gases influence the global climate change, there is now the need to reconsider these conventional approaches. It may also be assumed that underground storage of collected $CO_2$, when coupled to conventional steam-reforming processes, will not lead to the absolutely clean production of hydrogen from fossil energy sources.

Basically, there are two ways for producing hydrogen from hydrocarbons; namely oxidizing and non-oxidizing conversion.

Steam reforming of natural gas (primarily methane), also called SMR, is a very well developed and commercialized process, with which 48% of the hydrogen production worldwide are obtained. This technology is also realizable with other raw materials, such as ethane or naphtha, the efficiency achieved with such polymolecular substances is, however, lower (C.E. Gregoire Padro and V. Putsche, "Survey of the Economics of Hydrogen Technologies", September 1999, National Renewable Energy Laboratory). The SMR technology is based on the reaction of methane with hydrogen in the presence of a catalyst. Industrially, said process is conducted at about 800° C. and at a pressure of 2.5MPa. The first process step comprises conversion of methane with steam into CO and hydrogen. In the second step, also called water-gas reaction, CO is again converted with steam and provides $CO_2$, and further hydrogen. Although hydrogen produced in such a way has a larger energy content than methane, its effective energy yield is limited to 65% due to the energy demand during production. The accumulated $CO_2$ is separated from the product gas by means of membranes, which is freed from other foreign substances during further process steps. The gas accumulated during these steps, which, after all, consists of 60% of combustible components, is guided back into the reformer.

Referring to the Kyoto Protocol and to different state legislatures aiming at minimizing greenhouse gases, the biggest disadvantage of the SMR method is its high emission of $CO_2$. It is a central issue of the present invention to avoid this disadvantage. Moreover, the process described herein provides for economical conversion of hydrocarbon into hydrogen gas and, additionally, into utilizable fiber-like carbon.

Non-oxidizing methods comprise thermal dissociation, also called temperature-induced dissociation, pyolysis or cracking of hydrocarbons into hydrogen and hydrocarbon.

Thermal dissociation of natural gas has long been conducted and is one of the most important methods of soot production. In this context, natural gas is dissociated to hydrogen and soot at a high temperature in the range of from 1200 to 1800° C., wherein preferably air, oxygen or steam is added, in order to modify the obtained soot as well as to maintain the reactor temperature. General literature on this topic can be gathered from the monography, Winnacker-Küchler, vol 3, "anorganische Technologie II", $4^{th}$ edition, Carl Hanser Verlag, 1983. A new development regarding methane dissociation was recently presented by the Norwegian company Kvaemer, wherein hydrogen and soot are produced in a high-temperature plasma ("CB&H Prozess", Proc. $12^{th}$ World Hydrogen Energy Conference, Buenos Aires, 697, 1998). Advantages of this plasma-chemical process are high thermal efficiency (>90%) and purity of the hydrogen produced (98% by volume). Yet, this process is very energy-intensive.

To reduce the high reaction temperatures, catalyst-supported processes were suggested. In this context, it turned out that transition metals show high activity with respect to dissociation of methane. This involves, however, the drawback of carbon layers depositing on the catalyst surface. Mostly, the thus formed carbon coat was burned off under access of air to regenerate the catalyst, as a consequence thereof, again, the whole carbon is converted into $CO_2$ and hydrogen is the only utilizable product.

U.S. Pat. No. 1,868,921, Schmidt et al., reports on conversion of unsaturated hydrocarbons, preferably ethylene, into soot by means of nickel and/or cobalt catalysts applied on kieselguhr or ZnO at temperatures of about 600° C., does, however, not at all mention the noteworthy synthesis of hydrogen. U.S. Pat. No. 2,760,847, Oblad et al., deals with dissociation of low-molecular hydrocarbons for producing hydrogen by contact reaction on transition metals of group VI/b and VIII of the periodic system of elements which are dispersed in liquid host metal phase. U.S. Pat. No. 3,284,161, Pohlenz et al., describes a process for continuously producing hydrogen by means of catalytic dissociation of gaseous hydrocarbons. Methane is dissociated in a catalyst fluidized bed at temperatures of between 815 and 1093° C. Ni, Fe and Co-catalysts, preferably Ni/$Al_2O_3$, deposited on carriers, are used in this process. The catalyst covered with carbon is continuously removed from the reactor and the carbon is burned off in a regenerator, whereupon the reclaimed catalyst is guided back into the reactor.

Ermakova et al. examined the effect of the $SiO_2$ content on Ni and Fe-catalysts for synthesis of carbon filaments, wherein also efficiency of said catalysts for illustrating hydrogen was proposed (Ermakova et al., Catalysis Today, 77, (2002), 225-

235). The authors report on Ni and Fe—$SiO_2$-catalysts which have a metal content of between 85 and 90% by weight and which effectively dissociate methane into carbon filaments and hydrogen. The catalyst production comprises a two-step method, wherein α-$Ni(OH)_2$ with high specific surface is dispersed into a $SiO_2$-containing alcosol and the mixture resulting therefrom is calcined at temperatures of up to 700° C. Although the catalyst reduced at 700° C. had the lowest specific surface (7 $m^2$/g), it showed the highest catalytic activity. For comparison, according to BET, the catalyst calcined at 250° C. resulted in a specific surface of 400 $m^2$/g. Test experiments, wherein methane was catalytically dissociated, showed that methane can be dissociated to 16% with 10 mg of catalyst. At a reaction temperature of 500° C. and a volume flow rate of 20 mL/min of methane, a catalyst life span of 30 hours was indicated.

In U.S. Pat. No. 6,315,977 B there is described a method for producing hydrogen and nanotubes, wherein a hydrocarbon gas reacts on a reactor with two different zones, wherein the zones differ in temperature and catalyst composition.

JP 2003-146 606 A describes a method for producing hydrogen, wherein hydrocarbons on carbon nanohorns decomposite into hydrogen and carbon.

JP 2003-236 377 A shows a water-gas-shift-reaction catalyst which consists of a titanium nanotube. Such a catalyst can be used for reducing $NO_x$ from exhaust gases.

A further catalyst for producing hydrogen is described in JP 2004-074 061 A. Said catalyst consists of a carrier on silica-titanium-carbon-fiber basis and/or silica-titanium-carbon-nanofiber basis, said basis being impregnated with palladium and nickel compounds.

In CN 1,586,718 A there is shown a copper catalyst with a nanocarbon material for recovering hydrogen from methanol.

Recently, there have been large examinations on submicron-carbon structures and graphite filaments. Due to their many particular properties, such materials have been suggested as functional component in novel basic materials and functional parts. Such synthetic graphite structures surpass comparable materials presently used with respect to mechanical, electrical and chemical properties; such as, e.g., specific electrical resistance:

$10^{-4}$ Ωcm, maximum current load capacity: $10^{13}$ A/$cm^2$, thermal conductivity: 2000 W/mk, E-module: 1 Tpa, tensile strength: 30 GPa.

Basically, there are quite various possible uses for such materials, starting with the capability of storing hydrogen they are further usable as component in composite materials, as supercap material, as storage medium in Li-ions accumulators, in field emission displays, in PEM fuel cells, in electronics and as active component in actuators. Presently, regarding product-oriented development, polymer, metal-matrix and carbon-carbon composite materials, field-emission cathodes, electrodes and membranes for fuel-cell applications are to be highlighted. However, in order to render possible such developments at all, it is necessary to provide production means and synthesis processes which allow for producing large amounts at marketable prices. Thus, it is plain that substances used must be available easily and in sufficient amounts within the specification limits required, and the individual synthesis steps must occur in a largely automated way.

After nearly somewhat more than 30 years of increased research on how synthetic graphite fibers with a diameter smaller than 1 μm but with a length far above 1 μm develop, a considerable number of publications has been written, now giving some insight into this phenomenon which has not been completely explained yet. There are at least a few generally accepted basis facts with respect to this topic:

transition elements of the VIII group of PSE, Fe, Ni and Co, which are capable of forming metastable $Me_3C$ cemenite phases in the presence of carbon at certain temperature ranges. Although there is a certain kinetic stability, such Me—C systems are thermally balanced only when metal and graphite are present as separated phases.

the species delivering the carbon must form a stable vapor and/or gas phase at least in a given time interval.

The diameter of the catalytically formed fibers or whiskers is in direct relation to the size of the catalyst particle.

The field of whisker technology was researched from an academic view already in the early 1950s. In this context, metal, metal oxide, metal carbide and carbon whiskers were primarily examined. Since, however, no larger amounts could have been synthesized, nearly no data material on products and materials with such carbon filaments is available. On the other hand, one was occupied with developing and processing already commercially available pitch and PAN carbon fibers. Nevertheless, already at this time, the potential of the material class mentioned here was recognized and discussed in scientific publications already before 1980.

One key publication, the central issue of which being tube-shaped graphite filaments, was published by Bacon in 1960 [Bacon, R. J. Appl. Phys. 1960, 31, 285]. This publication and the further literature indicated therein describe chemistry and growth conditions of graphite whiskers, both by catalysts and also in the electric arc. The last-mentioned variant rendered possible the discovery of fullerenes. Measurement on single graphite whiskers, which showed extremely high E-modules and both electrical and thermal conductivities, suggested using them as reinforcement in composite materials and as electrically conducting component in intelligent plastics.

It is now an object of the present invention to provide a method for producing a hydrogen-containing gas mixture from a suitable hydrocarbon-containing feed gas in a reformer, wherein, on the one hand, formation of an as pure a hydrogen as possible with a low $CO_2$ portion and, on the other hand, a cost-effective method for producing nanocarbon become possible.

According to the invention, this object is achieved in that at least part of the feed gas is diverted before it enters the reformer and is supplied to at least one secondary reformer, wherein the feed gas in the secondary reformer is contacted with a nanostructured catalyst and the substantially CO and $CO_2$-free exhaust gases of the secondary reformer are either combined with the hydrogen-containing gas mixture which escapes the reformer or introduced into the reformer. In this context, according to the invention a gas enriched with hydrogen is produced in the secondary reformer, in addition to the nanocarbon secondarily deposited on the catalyst, said gas, by catalytic dissociation of the feed gas, having a hydrogen content of between 5 an 99,99999% by volume and a CO and $CO_2$ content of <1% by volume. Gas flows with a hydrogen content of above or about 80% by volume can be subjected directly to a further gas purification, wherein pure hydrogen is obtained at the end. For lower $H_2$ concentrations, <80% by volume, it is provided to feed the exhaust gas of the secondary reformer into the reformer. The advantages obviously resulting therefrom are: i) reduced coat of the reformer catalyst with inhibiting carbon layers by, i.a., smaller introduced carbon amounts; ii) considerable amounts of heat are taken from the secondary reformer into the reformer due to the high heat capacity of hydrogen, resulting in an energetically cheaper operation of the reformer; iii) the $CO_2$ content of the synthesis gas obtained after said process is considerably reduced. The $CO_2$ accumulated in the end is, however, needed as precious reactant, besides other possible reactive substances, for oxidation and/or surface modification of the nanocarbon catalytically generated in the secondary reformer, and is, thus, usefully utilized. The oxidizing aftertreatment of the nanocarbon is effected at temperatures of between 300 and 2000° C. If this oxidation treatment is done at a temperature of 500° C. or higher, $CO_2$ is converted substantially into CO, which, in turn, when fed into the shift reactor optionally following the reformer, contributes positively to the amounts yielded with respect to hydrogen. Additional feed of CO into the shift reactor, moreover, positively influences the energy balance of said component, since, as commonly known, the water gas reaction ($CO+H_2O=CO_2+H_2$) is very exothermal. In this context, the nanostructured catalyst used according to the invention can be present, e.g. also in the form of a pressed pellet which has sufficient porosity such that the entire active surface of the catalyst is available for the entering feed gas.

Preferably, according to the invention, the exhaust gases of the secondary reformer are pre-heated before they enter the reformer, which is achieved easily, i.a., thanks to the high heat capacity of the already present hydrogen and, furthermore, is done by taking considerable amounts of heat from the secondary reformer, resulting in an energetically cheaper operation of the reformer.

According to a further embodiment of the present invention, the exhaust gases of the reformer are post-combusted for removing carbon monoxide. As, according to the invention, the exhaust gases of the secondary reformer are combined with the exhaust gases of the reformer, this occurs in a cost-efficient way and with low energy demand in a shift reactor which, anyway, mostly follows a reformer. Moreover, the $CO_2$-containing exhaust gas escaping the shift reactor can be used for oxidation and/or surface modification of nanocarbon. For example, the consumed catalyst coated with nanocarbon can be collected in a post reactor and is there subjected to an oxidation and/or surface modification, when several secondary reformers are provided, it is also possible to switch from one to another and to effect oxidation and/or surface modification in the respective secondary reformer loaded with nanocarbon.

It is also favorable when the exhaust gases of the secondary reformer are combined with the hydrogen-containing gas mixture escaping the reformer and cooled down prior to post-combustion, in order to avoid reverse reaction of the water gas reaction. The present higher hydrogen concentration which is achieved due to the secondary reformer also allows for an enhanced heat removal of the heat set free by the water gas reaction. At the same time, by cooling down, preferably in a heat exchanger, the steam necessary for the reformer can also be generated and/or heated.

Furthermore, it is preferred to arrange the nanostructured catalyst on a carrier. So far it has been known that nanostructured catalysts, when applied on inert materials, such as $SiO_2$, MgO, $Al_2O_3$, SiC, graphite, etc., are capable of catalytically producing thinnest carbon fibers under temperature influence. The present invention, however, discloses some additional novelties with respect to their dual efficiency to generate both hydrogen and nanocarbon, which cannot be gathered from the literature freely available.

According to a yet further embodiment of the present invention, the carrier is a two-dimensional carrier, whereby the entire catalytic active surface of the catalyst material is used in a simple manner.

It is preferred that the carrier comprises particle-shaped ceramic bodies or particle-shaped glass bodies which, on the one hand, have a larger surface than two-dimensional carriers and which, on the other hand, can also be used in fluidized beds. Furthermore, particle-shaped carriers also have a higher mechanic stability.

It is further favorable when the nanostructured catalyst is continuously fed in and fed out in the secondary reformer. Thus, a continuous operation of the secondary reactor can be ensured and, at the same time, the nanocarbon deposited on the nanostructured catalyst can be separated continuously and be supplied for further use.

Preferably, the nanostructured catalyst and the feed gas in the secondary reformer are guided in cocurrent flow. By means of this guide a higher turnover time of the feed gas on the catalyst is achieved, thus resulting in a better gas exploitation and higher conversion factors.

According to a yet further embodiment of the present invention, the nanostructured catalyst and the feed gas in the secondary reformer are guided in counter-current flow. Thus, the catalyst is reduced more quickly and, thus, achieves a higher efficiency.

Furthermore, it is preferred to contact the feed gas in the secondary reformer with the nanostructured catalyst at a temperature in the range of from 300° C. to 1400° C. By selecting the appropriate temperature, growth and structure of the nanocarbon can be influenced and/or even controlled.

According to a yet further embodiment of the present invention, the feed gas in the secondary reformer is contacted with the nanostructured catalyst at a temperature in the range of from 400° C. to 700° C. At this temperature range the Ni-composite catalysts preferably used according to the invention have a very high efficiency.

Preferably, the catalyst is selected from the group consisting of group-VIII transition elements. These catalysts are known per se for producing nanocarbon.

It is also favorable when the catalyst is a composite catalyst which comprises a member selected from the group consisting of alkaline earth metal oxides, silicon, silicon oxide, and mixtures thereof. Such catalysts are particularly suited for producing filaments, as the inert component inside the catalyst particle effects a concentration gradient with respect to the carbon metastably dissolved in the metal. It is preferred that nickel and/or iron are used as catalyst. The catalysts preferably used according to the invention are based on Ni, Fe and NiFe and even more preferably have composite character, with a component inert with respect to the hydrocarbon dissociation. Referring to the reaction temperature, depending on their composition, a sphere of activity from 300 to 1400° C. is covered by the catalysts here indicated. According to the invention with said method, the highest efficiency with methane as hydrocarbon is achieved. Also with the background that methane has the most favorable C/H relation and, moreover, can be recovered in sufficient amounts by biological processes and independence of hydrocarbons of fossil origin is ensured. Without being committed to a theory, the catalysts can also be specifically efficiently designed for other hydrocarbons in terms of their basic structure in a simple manner. Thus, also higher hydrocarbons of the alkanes, alkenes, alkynes, cyclic hydrocarbons and their thermal dissociation products, provided that they exist in the vapor and/or gas phase at the given reaction temperatures, are absolutely suitable for running through the catalytic dissociation process. If not such a high attention is paid to the degree of purity of the thus produced hydrogen, hydrocarbon gases with foreign substances, such as nitrogen, hydrogen or sulfur, can be processed by means of the secondary reformer in this method. The foreign substances can be bound both in the air and in the hydrocarbon (e.g. as component of a functional group). Thus, acceptable concentration limits of the dissociation gas, which leaves the secondary reformer, can be adjusted in many regions. On the one hand, this is achieved by the composition of the feed gas, on the other hand, by the composition of the catalyst(s). As not difficult to understand, the key lies in the chemistry of producing nanocarbon by means of sufficiently catalytic active catalysts. Illustration of such particles, in particular regarding control of the average diameter distribution, is achieved by precipitation of Ni, Fe, Co, or any mixtures thereof, from aqueous solutions under adjustment of alkaline conditions. Thus, hydroxide precipitates are obtained which form a very high specific surface and are, thus, a prerequisite for their nanostructure. Base reagents used for adjusting pH values of 8 or above are alkali hydroxides, alkaline earth hydroxides, ammonia or ammonium hydroxide. When using alkali hydroxides attention has to be paid to the fact that the finished catalyst does not have any alkaline-metal foreign substances any longer, since they would affect activity of the catalyst. It is different when it is precipitated with alkaline earth hydroxide and/or alkaline earth oxide, since alkaline earth oxide as inert additional component has positive effects on the catalyst's activity in the composite catalyst. Attention has only to be paid that the content of alkaline earth oxide does not exceed 50% by weight, wherein, however, contents of less than 20% by weight are to be aspired. Accordingly, composite catalysts with MgO, CaO, MgO/CaO, and others, as inert component are easily accessible.

According to a yet further embodiment of the present invention the catalyst in the secondary reformer is continuously or discontinuously fed out, optionally as a function of the hydrogen content in the exhaust gas, and is separated from adhering carbon compounds. After separating the nanocarbon the fed-out catalyst is then continuously regenerated and/or recycled, and can be used again. Particularly preferably, this method step can be done in an automated way.

Preferably, the catalyst is mechanically separated from adhering carbon compounds, preferably by scraping off or in a cyclone. This is particularly advantageous when using a two-dimensional and/or solid carrier.

It is further preferred when the catalyst is chemically separated from adhering carbon compounds, preferably by an etching process. For example, by an etching process (acid treatment) the metallic catalysts can be separated and recycled in an easy manner.

It is also favorable when the catalyst is physically separated from adhering carbon compounds, preferably by high-temperature treatment, baking out, inductively, by RF or HF. This separating method is particularly gentle for the nanocarbons formed.

According to a yet further embodiment of the present invention natural gas is used as feed gas. Natural gas is the cheapest and most easily accessible variant of a feed gas, optionally, it is purified from sulfur compounds before it is used.

It is particularly preferred when an optionally pre-purified biogas is used as feed gas. Its composition is very similar to the one of natural gas and it allows for decoupling of fossil energy sources.

Preferably, part of the feed gas is used as heating gas for heating the reformer and/or secondary reformer. Thus, energy balance can be positively influenced, particularly when an optionally pre-purified biogas is used as feed gas and is available in sufficient amounts.

In view of the here mentioned it should be very clear that the process sequence mentioned here constitutes an important step for improving hydrogen production from hydrocarbons.

Let's assume, methane is dissociated on the Ni contact at 600° C., then a hot hydrogen-enriched gas mixture of the composition 33.33% by volume of methane and 66.66% by volume of $H_2$ is obtained. This is now fed into the reformer, where the remaining 33.33% by volume of $CH_4$ are converted into CO and $H_2$ by means of steam in the presence of a Ni catalyst. In numbers, this results in a reduction of $CO_2$ emissions by 50% with respect to the methane used.

The composite catalyst preferably used according to the invention can be produced as follows:

As known from the literature, $SiO_2$ has a very positive influence on the activity of transition materials from the VIII group. The central issue of this catalysts is also that, starting from in-situ produced metal hydroxide precipitates, either by parallel precipitation or by precipitation following directly afterwards, the "Si" or $SiO_2$ is unified also in a nanostructured way with the hydroxide.

According to the invention the $SiO_2$ containing Ni and Fe-catalysts and/or Ni, Fe and Ni/Fe-containing hydroxide or oxide powders are obtained either by precipitation of $SiO_2$ "onto" the metal hydroxide which is dispersed in water, alcohol, acetone or other suitable solvents. $SiO_2$ is deposited directly onto the hydroxide by dissociating tetra oxysilane (TEOS) by adding a base (e.g. $NH_3/H_2O$). In a further design of the invention substoichiometric $SiO_2$—$Ni(OH)_2$, $SiO_2$—$Fe(OH)_3$ or $SiO_2$—Ni/Fe hydroxides are obtained in one step by direct accompanying precipitation with the base addition. Also in this case it should be noted that the main component of the composite catalyst is the group-VIII transition metal, wherein said metal is present in a ratio of higher than 50 mol %, and/or is preferably higher than 80 mol % and even more preferred in a ratio higher than 90 mol %. If the components of the catalyst are directly precipitated from organic solvents (e.g. alcohol, acetone, THF, acetone nitrile, nitromethane and others), wherein both inorganic and organic bases (e.g. NaOH, $NH_3$, $NH_4OH$, TMEDA and others) can be used as precipitation reagents, precipitates are obtained according to the invention which have composite character and contain high-molecular silicone compounds, metal hydroxide and metal-Si-metal organyls. This mixture which forms the solid precipitate ensures very high specific surfaces (>20 $m^2/g$) and, thus, the nanostructure of said composite catalysts.

Thereafter, the thus synthesized catalyst powder is dried, wherein it should not be dried above 150° C. to keep to a minimum diffusion processes between the individual components and particles, since this can lead to undesired particle aggregation, which, in turn, causes sintering processes between the individual catalyst particles under operating conditions at a high temperature. This would necessarily limit activity of the catalysts in an undesired way.

Catalysts which are synthesized on the wet chemical way here described additionally include solvent molecules which are removed by calcining at a higher temperature. In certain cases, e.g. with catalysts having a higher inert portion, it is advantageous that it is calcined at temperatures of up to 1000° C. The process step causes formation of individual, crystallographic phases of both the inert component and the catalytically active metal component. After calcining the powder, a notable decomposition of the hydroxide to the oxide occurs at temperatures of above 150° C., which decomposition continues with an increasing temperature. At temperatures of above 350° C. this process is largely completed and further modifications of the catalyst are, thus, to be attributed to sintering effects. It is advantageous to conduct calcining under reactive atmosphere. By selecting appropriate gas atmospheres oxides, nitrides, carbides, and mixtures of the anion components, are presentable. If the powder is subjected to a reducing atmosphere after a certain time at a certain temperature, the inert component remains unaffected by the reduction and only the transition metal component is reduced to metal.

Such catalysts freed from foreign substances (e.g. solvents, thermally labile anions, etc.), are also directly accessible. For this purpose, Ni, Fe or any transition metal compounds are dissociated together with compounds containing the inert component or its precursor, at a high temperature, wherein temperatures of above 300° C. are to be understood, in the gas or vapor phase. Dissociation can also occur later on the wall of the heated vessel. In this case, it is a prerequisite to use compounds which are volatile enough and exist in the gas and/or vapor phase at least for a short time.

The inventive method is preferably used—as already mentioned—for producing high-quality technical soots, nanoonions, nanohorns, nanofibers and/or nanotubes which adhere to the catalyst. In this context, the nanocarbons constitute a valuable by-product of the hydrogen production.

BRIEF DESCRIPTION OF THE DRAWINGS

In the drawings, wherein like reference letters and numerals indicate corresponding structure throughout the several views.

Figure 1:
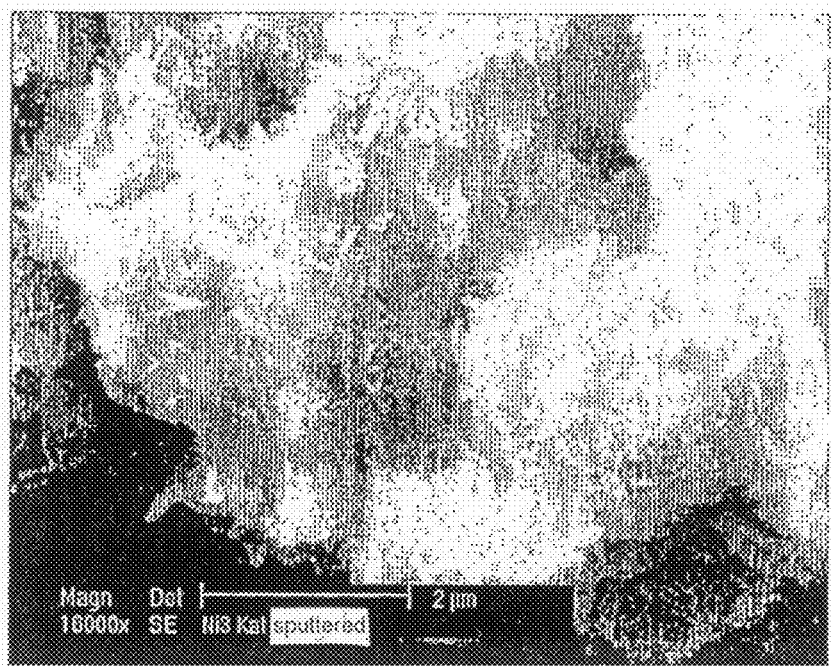
FIG. 1 is a SEM shot of a composite catalyst produced according to Example 1.

According to a further aspect of the present invention a device for producing a hydrogen-containing gas mixture from a suitable feed gas in a reformer (1) is provided, said reformer comprising a supply line (a) with a superheated-steam line (b) joining said supply line, and a discharge line (c), characterized in that at least part of the feed gas, before it enters the reformer (1), is diverted via a line (d) provided in the flowing direction in front of the junction of the superheated-vapor line (b), and is supplied to at least one secondary reformer (2), wherein the feed gas in the secondary reformer (2) is contacted with a nanostructured catalyst and the exhaust gases of the secondary reformer (2) are either combined with the hydrogen-containing gas mixture, which escapes the reformer, in a line (f) via a line (e) or are introduced into the reformer (1) via a line (g).

Preferably, a heat exchanger (3) is additionally arranged in the reformer (1), which exchanger can optionally be connected to the line (g).

It is also favorable when a heat exchanger (4) connected with the superheated steam line (b) via a line is additionally arranged in the reformer (1), and the exhaust gases of the secondary reformer (2) are fed into the vapor supply (i) of the heat exchanger (4) via a line (h).

According to a preferred embodiment the exhaust gases of the reformer (1) are guided into a heat exchanger (5) via the discharge line (c) and the arising vapor is fed into the vapor supply (i) of the heat exchanger (4).

Furthermore, it is favorable when the exhaust gases escaping the heat exchanger (5) are guided into a combustion reactor (6) via a line (j) for removing carbon monoxide.

According to a yet further preferred embodiment of the present invention the secondary reformer (2) comprises a supply and discharge arrangement (7) for continuous feed-in and feed-out of the nanostructured catalyst.

It is also preferred when part of the feed gas is diverted from the line (d) via a line (k) and is supplied to the reformer (1) and/or the secondary reformer (2) as heating gas via the line (k).

Preferably, the waste heat of the reformer is used for partially or fully heating the secondary reformer. For this purpose, in the device for producing a hydrogen-containing gas mixture according to the present invention, the reformer and the secondary reformer are connected by a heat-conducting element. In principle, the heat transfer is done by the temperature gradient in the heat-conducting element. Preferably, the reformer and the secondary reformer are accommodated in a reactor housing, where the reformer and the secondary reformer are separated by a gas-impermeable dividing wall which, together with the housing, constitutes a heat-conducting element.

The inventive method can be used for producing technical soots, nanoonions, nanohorns, nanofibers and/or nanotubes, in addition to hydrogen. The nanocarbon compounds which deposit on the catalyst of the secondary reformer are formed independently of the reformer. For this reason, in a further aspect, the invention provides a method for producing hydrogen and nanocarbons, decoupled from the steam reformer. In the German language use, soot means both undesired burn products ("chimney soot", "diesel soot"), which have a substantial portion of cancer-causing polycyclic hydrocarbons, and a valuable industrially produced soot, the carbon black, which should not be mixed up with chimney soot. Carbon blacks produced on a large scale are a big and divergent group of substances with exactly specifiable physically chemical properties. Depending on the field of application, parameters, such as specific surface (usually in the region of between 10-1000 m$^2$/g), particle diameter(usually between 5-500 nm) and structure, and further empiric parameters, such as vulcanization rate, iod or dibutylphtalate adsorption, abrasion and extrusion characteristics, are adapted. Carbon black is a valuable raw material for diverse uses, e.g. as dye, in rubber industry, mainly for producing tires, or in electrical industry, e.g. as material for electrodes. Usually, carbon black is produced by means of partial oxidation of natural gas or mineral oil with incomplete combustion at above 1000° C., leading to large amounts of $CO_2$. It has now surprisingly been ascertained that nanocarbons can partially or completely replace carbon black in its uses. The present invention now provides a method for producing a carbon-black alternative, being largely free of $CO_2$ emissions. Specifically, the present invention provides the use of a method for producing a hydrogen-containing gas mixture from a suitable carbon-containing feed gas, wherein at least part of the feed gas is supplied to a secondary reformer, wherein the feed gas in the secondary reformer is contacted with a nanostructured catalyst, and the substantially CO and $CO_2$-free exhaust gases of the secondary reformer are, in addition, optionally $CO_2$ reduced, for producing high-quality technical soots, nanoonions, nanohorns, nanofibers and/or nanotubes which adhere to the catalyst, and for using them as substitute for carbon black. Thus, these high-quality technical soots, nanoonions, nanohorns, nanofibers and/or nanotubes are a substitute for soot which is industrially produced by partial oxidation. The fields of application of the nanocarbons produced according to the invention correspond to the ones of carbon black. As necessary, the nanocarbons can be selected and produced analogously to the methods known in processing of carbon blacks, in order to meet the desired requirements. If necessary, the $CO_2$ content of the exhaust gases of the secondary reformer can additionally be reduced, e.g. by using a molecular sieve, by guiding feed gas back into the secondary reformer, by a compression method and separation of the hydrocarbons or by introduction into the steam reformer.

The advantages of the above-mentioned embodiments of the device according to the present invention result from the associated above-mentioned preferred designs of the method according to the invention.

Figure 2:
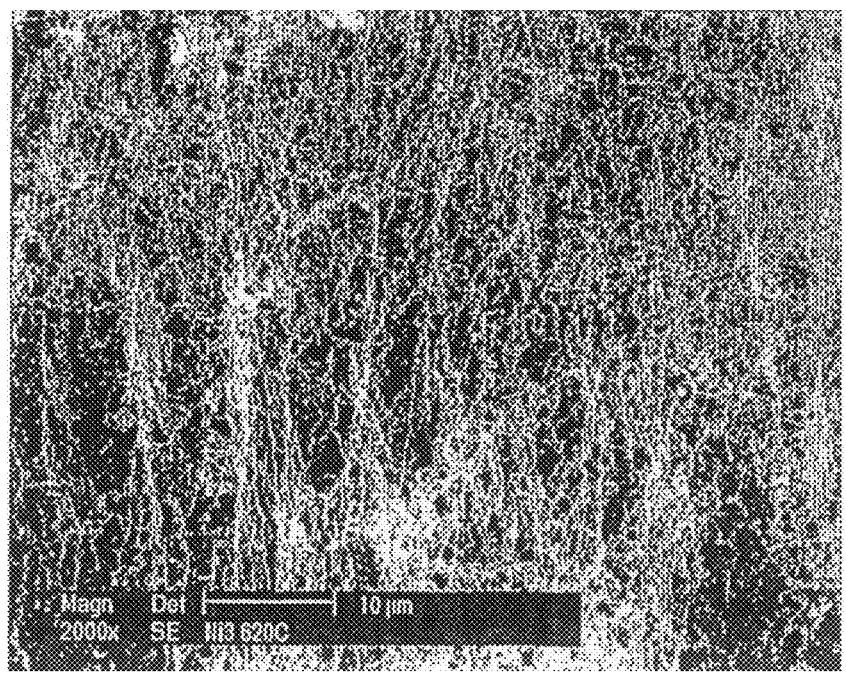
FIG. 2 shows carbon nanofibers from the reactor of Example 2.

The present invention will now be explained in more detail by way of the exemplary embodiment with reference to FIGS. 1 and 2 in the accompanying drawings:

EXAMPLE 1

$Ni(OH)_2$ was produced by ammonia precipitation at pH 9 from an aqueous solution of nickel nitrate.

The precipitate was collected in a Buchner funnel, thoroughly washed with deionized water, followed by acetone, and dried at 100° C. over several hours. 4.5 g of the thus produced $Ni(OH)_2$ powder were suspended in 100 ml acetone under vigorous stirring and, afterwards, 2 ml TEOS (tetraethoxysilane), 5 ml water and 2 ml ammonium hydroxide (25%) were added thereto. The suspension was mechanically stirred over night to ensure that virtually all of the TEOS was homogeneously applied on the $Ni(OH)_2$ precipitate as $SiO_2$. The solid residue was filtered off, washed as above and dried at 120° C. over several hours. FIG. 1 is a SEM shot of the thus produced composite catalyst.

EXAMPLE 2

200 mg of the composite catalyst were put in a ceramic boat which was given into a tubular furnace with a hot zone of 30 cm, equipped with a silica tube having a diameter of 40 mm and a length of 1000 mm. The silica tube was locked on both ends with appropriate locking devices which had a gas supply and gas outlet. The whole system was flushed with pure methane. After heating to the CVD reaction temperature of 620° C. had started, a methane gas flow of 90 ml/min was adjusted. The heating rate was 10° C. per minute and a constant temperature of 620° C. was maintained over 4 hours. After a temperature of 350° C. had been reached, an increase of the hydrogen content was observed in the exhaust gas. After 20 min and after the reaction temperature had been reached, a hydrogen concentration of 68% by volume was measured in the exhaust gas. During the 4 hours of experimenting, the hydrogen concentration continuously decreased, in the end it was still 51% by volume. After cooling down to room temperature, 3.87 g carbon nanofibers were removed from the reactor. FIG. 2 shows these carbon nanofibers which have a high graphite structure and an average diameter of from 50 to 70 nm.

Figure 3:
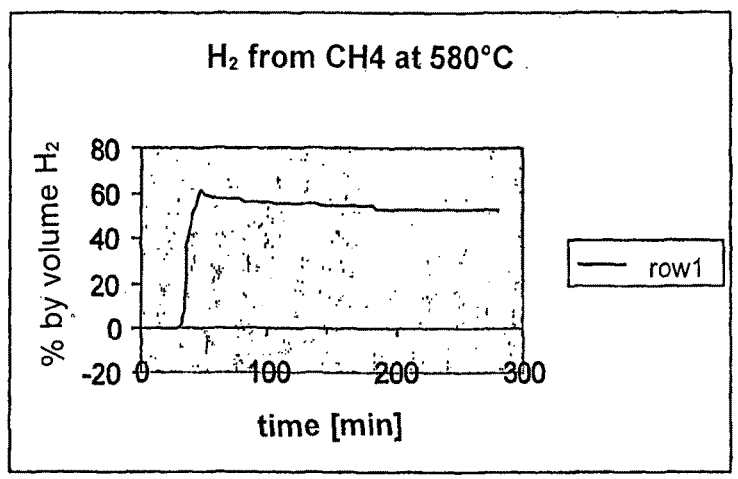
FIGS. 3-5 are graphs of hydrogen concentrations in the exhaust gases of a secondary reformer in Example 2 at different temperatures.
Figure 4:
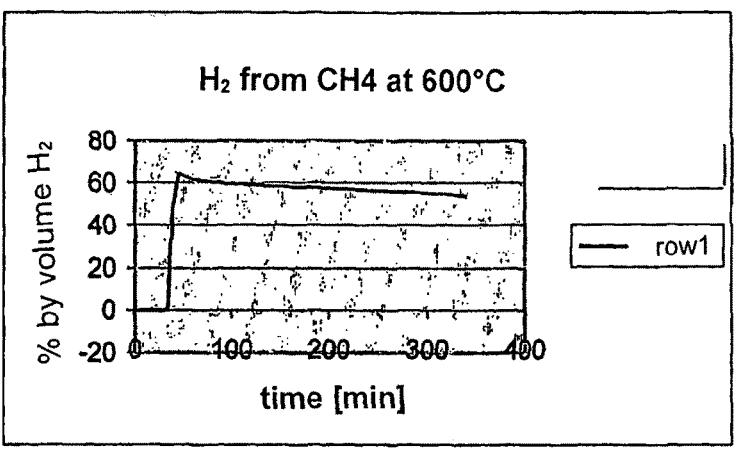
Figure 5:
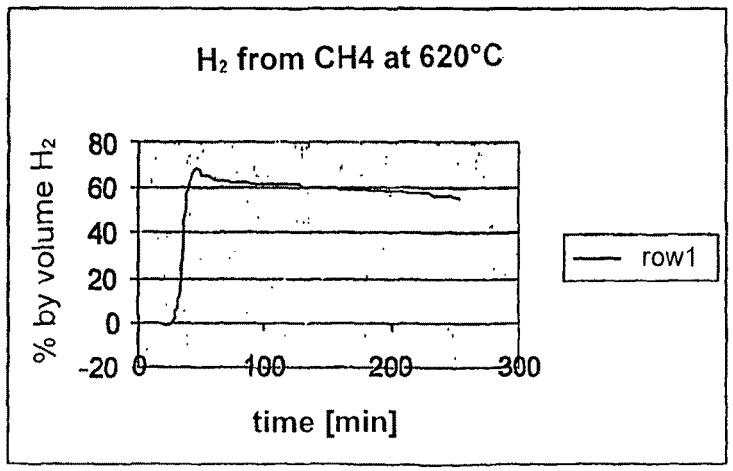

In the accompanying FIGS. 3 to 5, the hydrogen concentrations measured in the exhaust gas of the inventive secondary reformer described in example 2 over a certain period are graphically illustrated. It can be seen from all three figures that a virtually unchangedly high and stable hydrogen concentration could be achieved in the exhaust gas over the whole experimental period, from which a particularly high activity of the Ni-composite catalyst used, which was produced as described above, can be concluded.

The measurement of the hydrogen concentration in the exhaust gas of an inventive secondary reformer was done with a device of the company Siemens (DE), Calomat 6. Based on the data obtained by the measurements, the activity of the catalyst can be concluded at any time of the reaction. Thus, it is further possible to effect feed-in of a fresh, non-consumed catalyst and feed-out of a consumed catalyst covered with nanocarbon in an automated way by providing a hydrogen sensor in the exhaust-gas stream of the secondary reformer and by online evaluation of the obtained data on hydrogen concentration, if a supply and discharge arrangement is present for continuous feed-in and feed-out of the catalyst.

Figure 6:
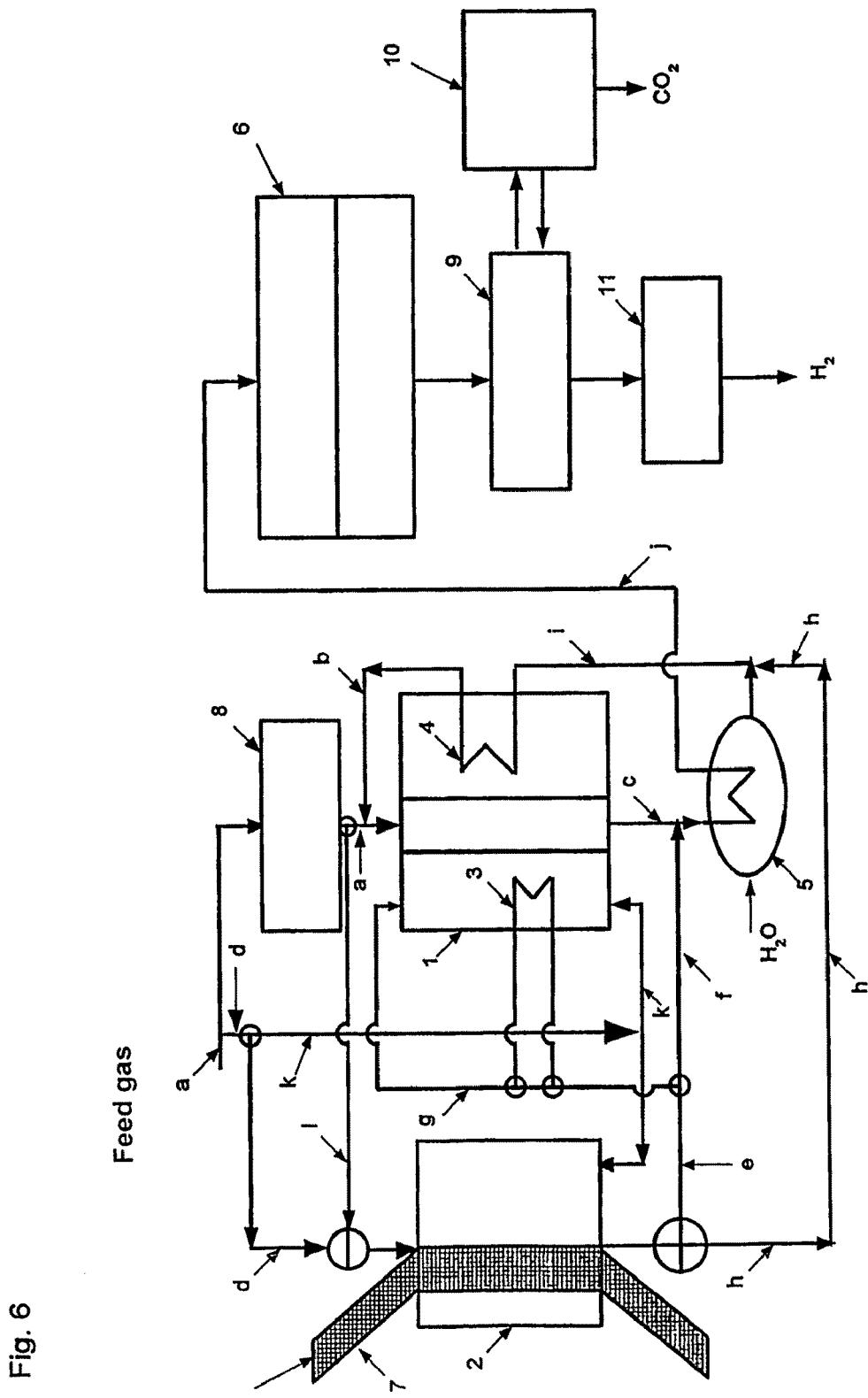
FIG. 6 is a diagrammatic view of a device for producing a hydrogen-containing gas mixture from a suitable feed gas according to the principles of the present invention.

The device according to the present invention will now be explained in more detail with reference to FIG. 6. Therein, a particularly preferred embodiment of the device according to the present invention is schematically shown, which comprises a reformer (1) with a supply line (a), with a superheated-steam line (b) joining said supply line, and a discharge line (c). Before entering the reformer (1), part of the hydrocarbon-containing feed gas is diverted from the supply line (a) either before it enters a sulfur removing plant (8) or thereafter—as a function of the purity of the feed gas and/or the selected reaction temperature and the type of catalyst—via the lines (d) and/or (1) which are provided in the flow direction in front of the junction of the superheated-steam line (b), and is introduced into a secondary reformer (2). A further part of the feed gas can be diverted from line (d) via a line (k) and can be supplied to the reformer (1) and/or the secondary reformer (2) as heating gas via line (k). In the present embodiment only one secondary reformer (2) is provided, alternatively also several secondary reformers can be connected in parallel. Said secondary reformer (2) is a "dry" reformer, i.e., contrary to the reformer (1), it is not supplied with steam. The secondary reformer (2) has a supply and discharge arrangement (7) for continuous feed-in and feed-out of the nanostructured catalyst. In the secondary reformer (2) the diverted feed gas is contacted with the nanostructured catalyst, the exhaust gases resulting therefrom (mainly hydrogen and non-converted feed gas) are then, via a line (e), either combined with the hydrogen-containing exhaust-gas mixture, which escapes the reformer via discharge line (c), via a line (f) or, if necessary, introduced into the reformer (1) via line (g) for further cleavage of feed gas by means of steam in the presence of, e.g. a nickel catalyst. Furthermore, a heat exchanger (3) is additionally arranged in the reformer (1), which exchanger can optionally be connected to the line (g). In the reformer (1) a heat exchanger (4) connected with the superheated steam line (b) via a line is additionally for equalizing temperature, in which heat exchanger the exhaust gases of the secondary reformer (2) can be fed into the vapor supply (i) of the heat exchanger (4) via a line (h). The exhaust gases of the reformer (1) are guided into a heat exchanger (5) via the discharge line (c), the arising vapor is fed into the vapor supply (i) of the heat exchanger (4). The exhaust gases escaping the heat exchanger (5), which consist either only of the exhaust gases of the reformer (1) or of the combined exhaust gases of the reformer (1) and the secondary reformer (2), are then guided into a combustion reactor (6) via a line (j) for removing carbon monoxide. This combustion reactor (6) is here designed as two-step shift reactor including a $CO_2$ washer following the same. A $CO_2$ stripper (10) is connected with the $CO_2$ washer (9) via a line. A methanator (11) is, in turn, connected to the $CO_2$ washer (9) for last purification of the hydrogen produced. Alternatively, depending on the quality of the exhaust gas formed in the secondary reformer (2), the exhaust gas can be fed directly into the $CO_2$ washer (9) and/or into the methanator (11) (not shown).

The invention claimed is:

1. Method for producing a hydrogen-containing gas mixture from a hydrocarbon-containing feed gas in a primary reformer, comprising: diverting at least part of the feed gas to at least one secondary reformer before the feed gas enters the primary reformer and supplying the feed gas to said at least one secondary reformer, wherein the feed gas is contacted with a catalyst in the secondary reformer, wherein the catalyst has a nanostructure, and the substantially CO and CO2-free exhaust gases of the secondary reformer are either combined with the hydrogen-containing gas mixture which escapes the primary reformer or is introduced into the primary reformer.

2. Method according to claim 1, wherein the exhaust gases of the secondary reformer are preheated before the exhaust gases enter the reformer.

3. Method according to claim 1, wherein the exhaust gases of the reformer are post-combusted for removing carbon monoxide.

4. Method according to claim 3, wherein the exhaust gases of the secondary reformer are combined with the hydrogen-containing gas mixture which escapes the reformer and cooled down before post-combustion.

5. Method according to claim 1, wherein the nanostructured catalyst is arranged on a carrier.

6. Method according to claim 5, wherein the carrier is a two-dimensional carrier.

7. Method according to claim 5, wherein the carrier comprises particle-shaped ceramic bodies or particle-shaped glass bodies.

8. Method according to claim 1, wherein in the secondary reformer the nanostructured catalyst is continuously fed in and fed out, optionally as a function of the hydrogen content in the exhaust gas.

9. Method according to claim 8, wherein the nanostructured catalyst and the feed gas in the secondary reformer are guided in co-current flow.

10. Method according to claim 8, wherein the nanostructured catalyst and the feed gas in the secondary reformer are guided in counter-current flow.

11. Method according to claim 1, wherein the feed gas in the secondary reformer is contacted with the nanostructured catalyst at a temperature in the range of from 300.degree. C. to 1400.degree. C.

12. Method according to claim 11, wherein the feed gas in the secondary reformer is contacted with the nanostructured catalyst at a temperature in the range of from 400.degree. C. to 700.degree. C.

13. Method according to claim 1, wherein the catalyst is selected from the group consisting of group-VIII transition elements.

14. Method according to claim 13, wherein the catalyst is a composite catalyst which comprises a member selected from the group consisting of alkaline earth metal oxides, silicon, silicon oxide, and mixtures thereof 15. Method according to claim 13, wherein nickel and/or iron is/are used as catalyst.

16. Method according to claim 1, wherein the catalyst in the secondary reformer is continuously or discontinuously fed out and separated from adhering carbon compounds.

17. Method according to claim 16, wherein the catalyst is mechanically separated from adhering carbon compounds by scraping off or in a cyclone.

18. Method according to claim 16, wherein the catalyst is chemically separated from adhering carbon compounds by an etching process.

19. Method according to claim 16, wherein the catalyst is physically separated from adhering carbon compounds by high-temperature treatment, baking out, inductively, by RF or HF.

20. Method according to claim 1, wherein natural gas is used as feed gas.

21. Method according to claim 1, wherein an optionally pre-purified biogas is used as feed gas.

22. Method according to claim 1, wherein part of the feed gas is used as heating gas for heating the reformer and/or secondary reformer.

23. A method according to claim 1, wherein the secondary reactor is at least partially heated by the waste heat of the reformer.

24. A method according to claim 1, including the step of introducing technical soots, nanoonions, nanohorns, nanofibers and/or nanotubes which adhere to the catalyst.

25. A method for producing a hydrogen-containing gas mixture from at least one carbon-containing feed gas, the method comprising: supplying a first part of the feed gas to a primary reformer and a second part of the feed gas to a secondary reformer; contacting the feed gas in the secondary reformer with a nanostructured catalyst that has a nanostructure, and the substantially CO and CO2-free exhaust gases of the secondary reformer are either combined with the hydrogen-containing gas mixture which escapes the primary reformer or is introduced into the primary reformer, optionally the substantially CO and CO2-free exhaust gases of the secondary reformer are reduced in order to produce technical soots, nanoonions, nanoho,r,ns, nanofibers and/or nanotubes which adhere to the catalyst, and to facilitate use of the technical soots, nanoonions, nanohorns, nanofibers and/or nanotubes as substitute for industrial soot.

26. Device for producing a hydrogen-containing gas mixture from a feed gas in a reformer, said reformer comprising:
a supply line with a superheated-steam line joining said supply line, a discharge line, a first line, a second line and a third line, wherein the first line, provided in the flowing direction in front of the junction of the superheated-vapor line, is configured to divert at least a part of the feed gas to at least one secondary reformer before the feed gas enters a primary reformer, so that the feed gas in the secondary reformer is contacted with a nanostructured catalyst, the secondary reformer comprising a supply and discharge arrangement for providing continuous feed-in and feed-out of the nanostructured catalyst; and
an exhaust line configured to direct the substantially CO and CO2-free exhaust gases of the secondary reformer to combine with the hydrogen-containing gas mixture of the discharge line via the second line, or configured to connect to the third line to introduce the exhaust gases into the primary reformer, wherein the exhaust line is positioned to facilitate escape of gases from the secondary reformer.

27. Device according to claim 26, wherein a heat exchanger is additionally arranged in the reformer, wherein the exchanger can optionally be connected to the third line.

28. Device according to claim 26, wherein a heat exchanger connected with the superheated steam line via a line is additionally arranged in the reformer, and further including means for feeding the exhaust gases of the secondary reformer into the vapor supply of the heat exchanger via a fourth line.

29. Device according to claim 28, including means for guiding the exhaust gases of the reformer into a heat exchanger via the discharge line and feeding the arising vapor is fed into the vapor supply of the heat exchanger.

30. Device according to claim 29, including means for guiding the exhaust gases escaping the heat exchanger into a combustion reactor via a line for removing carbon monoxide.

31. Device according to claim 26, including means for diverting part of the feed gas from the first line via a fifth line and suppling the diverted part of the feed gas to the reformer and/or the secondary reformer as heating gas via the fifth line.

32. Device according to claim 26, wherein the reformer and the secondary reformer are connected by a heat-conducting element.

* * * * *